Figure 1:
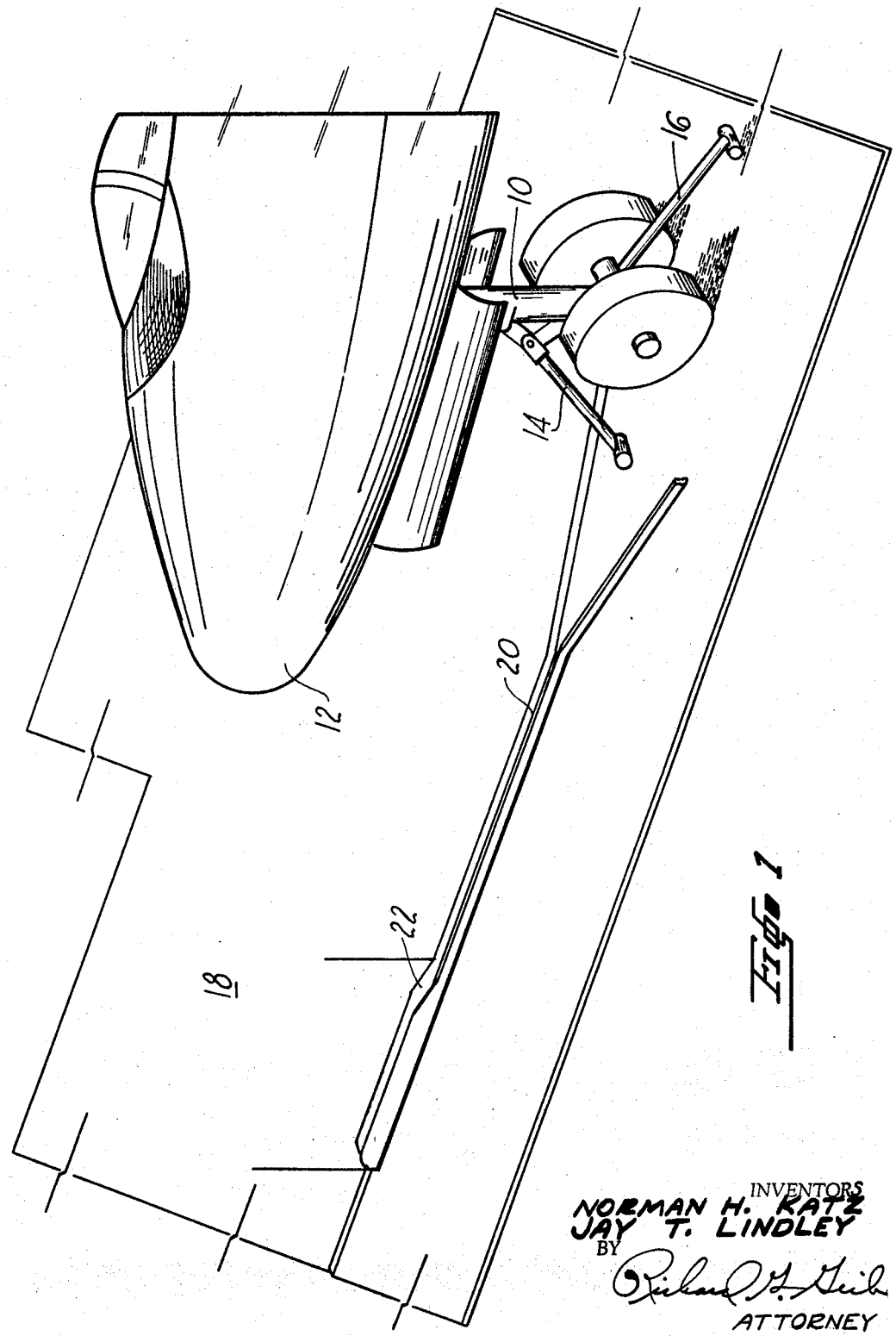

Aug. 9, 1966  N. H. KATZ ETAL  3,265,381

SHOCK ABSORBER

Filed May 27, 1964  2 Sheets-Sheet 1

INVENTORS
NORMAN H. KATZ
JAY T. LINDLEY
BY
Richard G. Geib
ATTORNEY

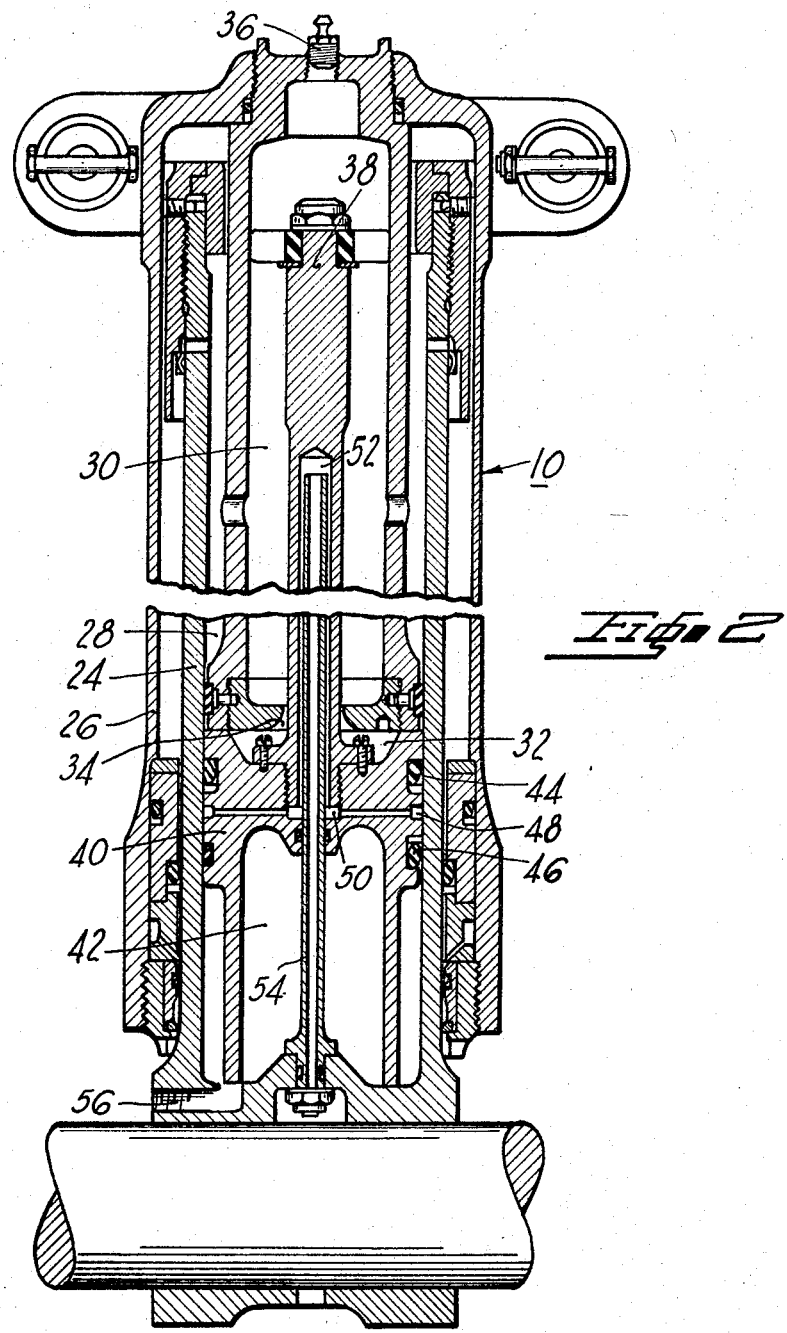

3,265,381
SHOCK ABSORBER

Norman H. Katz and Jay T. Lindley, South Bend, Ind., assignors to The Bendix Corporation, South Bend, Ind., a corporation of Delaware
Filed May 27, 1964, Ser. No. 370,560
1 Claim. (Cl. 267—64)

This invention relates generally to landing gears but more particularly to a landing gear for use on catapult aircraft which can have its resistance to stroking increased while the aircraft is being catapulted.

In the past it has been customary to use slings or yokes connected between the fuselage of the aircraft and the catapult shuttle. Such yokes or slings do not provide adequate guidance of the aircraft during the catapult run and are unnecessarily clumsy. A landing gear, according to this invention, is particularly suited for use in aircraft wherein the catapult is connected to the nose landing gear. To eliminate pitching or porposing the aircraft during the catapult run, the landing gear is arranged to have increased resistance to compression during the catapult run.

It is an important object of this invention to provide an aircraft landing gear having means which can be operated to hydraulically increase the resistance for the landing gear is a predetermined position.

It is another important object of this invention to provide an aircraft landing gear suitable for use in catapults which is substantially rigid in an extended position during the catapult operation.

It is still another object of this invention to provide an aircraft landing gear having a normal gas compression rate for landing operation and which has a substantially higher gas compression rate for catapult launching operations.

It is still another important object of this invention to provide an aircraft landing gear wherein compressed gas is used in combination with hydraulic damping during the landing operation and wherein the pressure of the gas is substantially increased to increase the compression rate during a take-off operation.

Further objects and advantages will appear from the following description and drawings wherein:

FIGURE 1 is a perspective view of a portion of a take-off surface and aircraft utilizing an invention in accordance with our principles; and FIGURE 2 is a longitudinal sectional view of a shock absorbing strut embodying the invention.

With reference to FIGURE 1, the invention is shown to be utilized in a dual wheel nose gear 10 of an aircraft 12 carrying a tow bar 14 and a trailing, holdback bar 16. The bars 14 and 16 are adapted for hook coupling with a shuttle (not shown) operatively arranged on a take-off surface 18. A deck track 20 and a ramp 22 aid in positioning the bars in coupling relationship with the shuttle, whereas, a tensioner (not shown) chocks them securely.

So much for the catapulting and general aircraft structure which are arranged in a generally cooperative relationship as aforedescribed. The extreme acceleration required for a catapult operation creates a tendency for the aircraft 12 to porpoise during the catapult run. Porpoising, which is the vertical oscillation of the aircraft, tends to occur when the line of action of the catapult force does not pass through the center of gravity of the aircraft. In the past, as aforementioned, a long sling has been used which connects the catapult shuttle to the fuselage of the aircraft. Because the sling was long the angle of the catapult force did not change very much even when there was some pitching movement of the aircraft. These long slings, however, are difficult to use and do not adequately guide the aircraft. In the illustrated embodiment of this invention, the catapult shuttle is connected by a short bar to the nose landing gear. By providing a substantially rigid nose landing gear through which the catapult force is transmitted to the aircraft, it is possible to eliminate proposing during the catapult run.

In the landing gear 10, as seen in FIGURE 2, a piston member 24 telescopes into a cylinder member 26 to define a fluid tight cavity 28 having an upper variable volume chamber 30 and a lower variable volume chamber 32 separated by an orifice plate 34 carried by an orifice support tube. The lower variable volume chamber 32 is filled with oil which is forced through the orifice 34 during the compression of the landing gear, until the landing gear is fully compressed, as it is seen in FIGURE 2. The upper chamber contains a portion of the aforesaid oil and a larger portion of compressed air to provide the extension of the gear. As seen, the compressed air is introduced to the upper variable volume chamber 30 by means of the fitting 36 at the top of the landing gear 10. In order to meter the flow of oil through the orifice plate 34 we have provided a metering pin 38 that is arranged to extend through the orifice plate and whose sides are designed to monitor the space between the pin and the orifice in the plate 34 according to the desired force vs. travel characteristics to be associated with the landing gear 10. As seen the metering pin 38 is shown to be in its maximum travel position, and when the cylinder 26 and piston 24 are fully extended the metering pin 38 will be barely projecting through the orifice plate 34.

The metering pin 38 is affixed to a floating piston 40 that is subject not only to the pressure of the oil and the gas in the variable volume chambers but to the pressure within a variable volume chamber 42 therebelow, as well. The metering pin is threaded to the piston, as seen in FIGURE 2, and locked by a pair of bolts.

The piston 40 is provided with an upper and lower seal means 44 and 46 to prevent fluid commingling between the chambers 32 and 42. Furthermore, any leakage flow by the seals 44 or 46 will be directed by means of a radial passage 48 towards the center of piston 40 where it opens into a cavity 50 communicating with a drilled passage 52 in the metering pin that is opened to a drain tube 54 so that the leakage, if there be any, pass the seals 44 and 46 may be vented overboard through the tube 54 out the bottom of the shock absorber 10. In addition the bottom of the piston 24 is drilled, as at 56, and appropriately tapped to receive a hydraulic fluid pressure line from a hydraulic fluid pressure source (not shown) such as is familiarly associated with an aircraft. Furthermore, the hydraulic fluid pressure source may be the same fluid pressure source for the aircraft control system having an additional valve therein that will allow the porting of hydraulic pressure to the connection 56.

In operation the aforementioned valve associated with the aircraft hydraulic system, when open to direct fluid to the port 56, will cause a pressure to exist in chamber 42 that will tend to raise the piston 40 and consequently metering pin 38 from its normal rest position where it abuts the lower surface of cylinder 24 as shown. This forces the shock absorber oil in the variable volume chamber 32 through the orifice plate 34 to have the effect of precompressing the air charge within the upper variable volume chamber 30 increasing the gas pressure in the shock absorber 10. It will thus be realized by those skilled in the art to which our invention relates that the landing gear 10 will be substantially rigid in an extended position, and yet will have greater flexibility to an irregular landing surface and/or objects thereon than designs heretofore proposed. Furthermore, our design allows for continued metering of shock absorber fluid during a landing run; whereas designs of the prior art are concerned with shock absorbing to the extent that the shock absorber oil has compressibility.

In other words, while the metering pin moves up through the orifice plate, the piston 24 would still be allowed to displace fluid against the gas pressure. Devices in the prior art are concerned with creating a fluid lock. This means that the aircraft must absorb shock upon the basis of the limited compressibility of a liquid.

Our invention would only have a fluid lock when the pressure in chamber 42 exceeds the gas pressure in chamber 30, as when piston 40 is bottomed on the orifice tube.

Although a particular embodiment of our invention has been described, it will be understood by those skilled in the art that the object of the invention may be attained by the use of constructions different in certain respects from that disclosed without departing from the underlying principles of the invention. I therefore desire by the following claim to include within the scope of our invention all such variations and modifications by which substantially the same results of our invention may be obtained through the use of substantially the same or equivalent means.

We claim:

An aircraft landing gear comprising:

a cylindrical member;

a tubular member closed at one end and having a piston face at the other end, which tubular member is operatively connected to said cylindrical member such that it will telescopingly move into and out of said cylindrical member with said piston cooperating with the cylindrical member to prescribe two internal variable volume chambers;

an orifice means operatively connected to said cylindrical member and said tubular member having passage for communication of said variable volume chambers;

a floating piston means operatively connected to said tubular member for reciprocatory movement therewithin, said floating piston being provided with upper and lower seal means for preventing commingling of fluid above and below said floating piston, said floating piston being further provided with a radial passage between said upper and lower seal means, which radial passage leads inwardly to a cavity within said floating piston means to provide a leakage collection chamber for any fluid leaking by either the upper seal means or the lower seal means;

a metering pin affixed to said floating piston means which metering pin is provided with a passage open at one end to said cavity in said floating piston means and closed at the other end to prevent communication of the cavity with either of the two variable volume chambers; and a drain tube affixed to the closed end of said tubular member which drain tube extends upwardly through the floating piston means into the passage of said metering pin for a sufficient length to permit drainage regardless of metering pin position within said variable volume chambers, as may be brought about by telescoping movement of said tubular member within said cylindrical member, said drain tube having an internal passage leading from the passage in the metering pin through the drain tube and to the exterior of said tubular member to provide an overboard vent for any leakage fluid in the cavity of the floating piston means.

References Cited by the Examiner
UNITED STATES PATENTS

| | | | |
|---|---|---|---|
| 2,364,823 | 12/1944 | Schnell | 267—64 |
| 2,373,505 | 4/1945 | Schnell | 267—64 |
| 2,735,634 | 2/1956 | Fossness | 267—64 |
| 2,814,482 | 11/1957 | Anderson et al. | 267—64 |

ARTHUR L. LA POINT, *Primary Examiner.*

H. R. FIELD, R. M. WOHLFARTH,
*Assistant Examiners.*